United States Patent
Moon

(10) Patent No.: US 10,897,437 B2
(45) Date of Patent: Jan. 19, 2021

(54) METHOD FOR PROVIDING USER PROFILE INFORMATION TO DESIGNATED ONLINE FRIEND IN INSTANT MESSAGING SERVICE, SERVER, USER DEVICE AND APPLICATION IMPLEMENTING THE METHOD

(71) Applicant: KAKAO CORP., Jeju-si (KR)

(72) Inventor: Je Keun Moon, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 16/503,748

(22) Filed: Jul. 5, 2019

(65) Prior Publication Data

US 2020/0014643 A1    Jan. 9, 2020

(30) Foreign Application Priority Data

Jul. 6, 2018   (KR) .................. 10-2018-0079024

(51) Int. Cl.
*H04L 12/58* (2006.01)
*G06Q 20/32* (2012.01)

(52) U.S. Cl.
CPC ......... *H04L 51/046* (2013.01); *G06Q 20/322* (2013.01); *H04L 51/24* (2013.01); *H04L 51/26* (2013.01)

(58) Field of Classification Search
CPC ....... H04L 51/046; H04L 51/24; H04L 51/26; G06Q 20/322; G06Q 50/01
See application file for complete search history.

(56) References Cited

U.S. PATENT DOCUMENTS

| | | | |
|---|---|---|---|
| 2012/0042392 A1* | 2/2012 | Wu .................. | H04L 63/102 726/28 |
| 2012/0303652 A1* | 11/2012 | Tseng | |
| 2013/0103946 A1* | 4/2013 | Binenstock ........... | H04L 63/102 713/168 |
| 2015/0058957 A1* | 2/2015 | Halliday ............... | H04W 12/06 726/7 |
| 2016/0117670 A1* | 4/2016 | Davis ................... | G06Q 20/386 705/39 |

(Continued)

FOREIGN PATENT DOCUMENTS

KR   10-2009-0054283   5/2009
KR   10-2013-0065874   6/2013

(Continued)

*Primary Examiner* — Christopher B Robinson
(74) *Attorney, Agent, or Firm* — Lex IP Meister, PLLC

(57) ABSTRACT

A user profile information providing method for a messaging server that provides an instant messaging service to provide user profile information, includes: receiving private profile information set in a terminal of a user who uses the instant messaging service for a targeted friend; storing the private profile information corresponding to the targeted friend; and transmitting the private profile information to a terminal of the targeted friend. The private profile information is displayed differently from default profile information of the user, and is displayed as a profile of the user only in the terminal of the targeted friend. The default profile information is displayed as a profile of the user in terminals of friends, in which the private profile information is not set, among friends of the user.

20 Claims, 8 Drawing Sheets

(56) References Cited

U.S. PATENT DOCUMENTS

| | | | |
|---|---|---|---|
| 2016/0182526 A1* | 6/2016 | Underwood | H04L 63/10 726/28 |
| 2018/0136612 A1* | 5/2018 | Zayets-Volshin | H04M 1/72583 |
| 2019/0042085 A1* | 2/2019 | Barnett | G06F 9/44 |
| 2019/0288976 A1* | 9/2019 | Sharp | H04L 51/32 |
| 2020/0167699 A1* | 5/2020 | Cohen | H04L 51/32 |

FOREIGN PATENT DOCUMENTS

| | | |
|---|---|---|
| KR | 10-1551401 | 9/2015 |
| KR | 10-2016-0015415 | 2/2016 |
| KR | 10-1654261 | 9/2016 |
| KR | 10-2016-0148376 | 12/2016 |
| KR | 10-2017-0070679 | 6/2017 |

* cited by examiner

FIG. 5
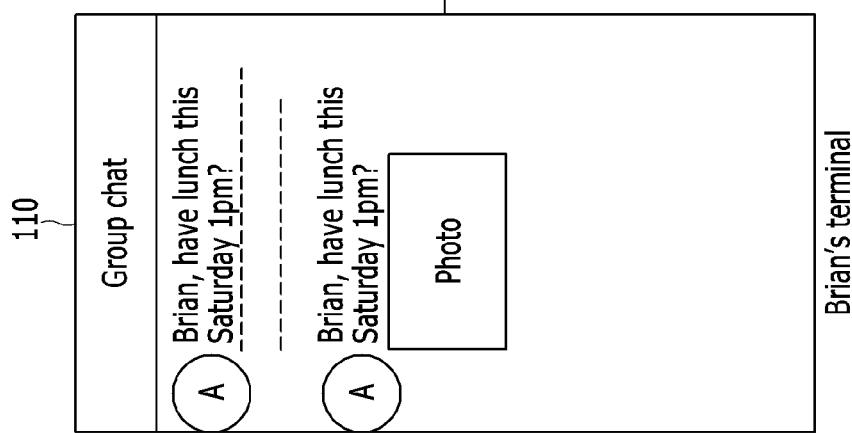
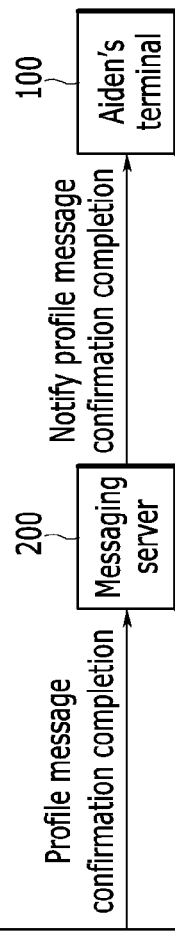

METHOD FOR PROVIDING USER PROFILE INFORMATION TO DESIGNATED ONLINE FRIEND IN INSTANT MESSAGING SERVICE, SERVER, USER DEVICE AND APPLICATION IMPLEMENTING THE METHOD

CROSS-REFERENCE TO RELATED APPLICATION

This application claims priority to and the benefit of Korean Patent Application No. 10-2018-0079024 filed in the Korean Intellectual Property Office on Jul. 6, 2018, the entire contents of which are incorporated herein by reference.

BACKGROUND

(a) Field

The present disclosure relates to an instant messaging service.

(b) Description of the Related Art

There are various social media services such as Kakao Talk, Twitter, Facebook, Instagram, and the like. A user can communicate with the another party through such a social media service and express his/her thoughts. The user exchanges messages with friends in a chat room through an instant messaging service such as Kakao Talk.

The user may set profile information such as name, photo, and status message on his/her profile management screen, and profile information set by the user is provided to all people equally, or the user may set his/her profile information to be displayed differently according to the other party. Thus, a variety of people such as family members, school friends, work-related persons such as company or business partners, school teachers, or parents make friends and exchange messages in the same instant messaging service such as Kakao Talk, and online friends have no choice but to see the same profile that a user has set regardless of a relationship to the user in real life. Thus, the user may be reluctant to expose personal information or personal status in profile information, and care must be taken in setting the profile information. In addition, even if there is a simple message or a feeling to express to a specific party, the user has a limitation in transmitting a message to a specific party or expressing emotion unless a message is input in a chat room with the other party.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a method for providing a user' profile displayed to an online friend differently in an instant messaging service, a server, a user terminal, and an application that implement the same.

The present disclosure has been made to provide a method for setting a profile message that can be displayed only to a targeted friend by using a user profile as a message transmission means, transmitting a simple message or information only to the targeted friend through the profile message, and linking the profile message with various services.

According to an exemplary embodiment, a method for providing user profile information by a messaging server that provides an instant messaging service is provided. The method includes: receiving private profile information which includes a profile message set for a targeted friend, from a terminal of a user who uses the instant messaging service; storing the private profile information corresponding to the targeted friend; and transmitting the private profile information to a terminal of the targeted friend. The private profile information is inputted in a private profile setting screen displayed on the terminal of the user. The private profile information is different from default profile information of the user, and is displayed as a profile of the user only in the terminal of the targeted friend. The profile message includes at least one function. The default profile information is displayed as a profile of the user in terminals of friends, in which the private profile information is not set, among friends of the user.

The method may further include controlling the default profile information to be displayed instead of the private profile information in the terminal of the targeted friend when a valid time period of the private profile information expires.

In the controlling, it may be determined that the valid time period of the private profile information has expired when a predetermined time limit set in the private profile information has expired or an operation set in the private profile information is completed.

The operation set in the private profile information may include confirmation action of the profile message included in the private profile information or payment/remittance to a bill included in the private profile information.

The method may further include notifying the terminal of the user that the private profile information set for the targeted friend is changed to the default profile information.

According to another exemplary embodiment, a method for providing user profile information of an instant messaging application by a terminal is provided. The method includes: when a private profile setting is requested, displaying a private profile setting screen in which default profile information set for friends is specifically changed and displayed for a targeted friend; receiving private profile information which includes a profile message in the private profile setting screen; and transmitting the private profile information for the targeted friend to the messaging server. The private profile information may be displayed only to a terminal of the targeted friend as a profile of the user. The profile message includes at least one function. The default profile information may be displayed as a profile of the user on terminals of friends other than the targeted friend.

The private profile setting screen may be an interface screen where at least one of a name, a photo, and a status message included in the default profile information is specifically changed for the targeted friend.

The private profile setting screen may include a profile setting region where a billing message that requests the targeted friend for payment or remittance is input as the profile message, and the billing message may be linked with a payment/banking application such that the amount of bill requested through the billing message is paid or sent from the terminal of the targeted friend.

The method may further include: after private profile information including the billing message is transmitted to the messaging server, receiving a payment completion message or a remittance completion message with respect to an amount of a bill required through the billing message or receiving a notification message notifying that the private profile information is changed to the default profile information.

The private profile setting screen may include a profile setting region through which a message transmitted to the targeted friend is written and a confirmation request message that request confirmation with respect to the content written in the message is input as the profile message. The method may further include, after private profile information including the confirmation request message is transmitted to the messaging server, receiving a confirmation completion result of the targeted friend with respect to the confirmation request message or receiving a notification message notifying that the private profile information is changed to the default profile information.

The private profile setting screen may include a profile setting region through which a time-related alarm message is input to the targeted friend, and the time-related alarm message may be linked with a time calculation application or a calendar application.

The displaying the private profile setting screen may display the private profile setting screen when a region where a "my profile" change function is assigned in a profile screen of the targeted friend.

The receiving of the private profile information may further include receiving a valid time period of the private profile information, and, after the valid time period has expired, the default profile information instead of the private profile information may be displayed in the terminal of the targeted friend.

According to another exemplary embodiment, a method for providing friend profile information of an instant messaging application by a terminal of a user is provided. The method includes: receiving private profile information of a friend from a messaging server; and displaying the private profile information which includes a profile message set for the user, as a profile of the friend in an interface screen of the instant messaging application, instead of default profile information of the friend. The private profile information is different from the default profile information. The profile message includes at least one function.

The private profile information may include information that is different from at least one of a name, a photo, and a status message included in the default profile information.

When the private profile information includes a billing message that includes a payment request or a remittance request, the displaying of the private profile information as the profile of the friend may display a billing message as the profile message of the friend. The method for providing user profile information may further include, when the billing message is selected, a payment/banking application that is linked to pay or send a bill amount requested in the billing message is executed and displayed; and changing the profile of the friend to the default profile information from the private profile information after payment or remittance with respect to the bill amount requested in the billing message is completed.

The private profile information as the profile of the friend may display a confirmation request message included in the private profile information as the profile of the friend. The method for providing user profile information may further include: when the confirmation request message is selected, transmitting a confirmation completion message with respect to the confirmation request message to the messaging server; and changing the profile of the friend to the default profile information from the private profile information.

According to another exemplary embodiment, an application stored in a computer readable storage medium includes instructions. The instructions executes: displaying a private profile setting screen for changing "my profile" displayed on a terminal of a first friend when a "my profile" change button is selected in a terminal of a user, receiving private profile information set for the first friend from the private profile setting screen, and transmitting the private profile information for the first friend to a messaging server; and when private profile information of a second friend is received from the messaging server, displaying private profile information of the second friend instead of default profile information of the second friend in an interface screen that displays profile information of the second friend. The private profile information for the first friend includes a first profile message set for the first friend. The first profile message is displayed on the first friend's terminal. The first profile message includes at least one function. The private profile information of the second friend includes a second profile message set for the user. The second profile message is displayed on the user's terminal. The second profile message includes at least one function.

In the private profile setting screen, the private profile information may be set by changing "my default" profile information or adding information to the "my default" profile information.

The application may include instructions that further execute displaying default profile information of the second friend instead of private profile information of the second friend in an interface screen that displays profile information of the second friend when a valid time period of the private profile information of the second friend has expired.

According to the present disclosure, a user sets the profile information such as his/her name, photo, and status message differently according to friends so as to freely express various information and feelings to a friend according to the relationship between the user and the friend. According to the exemplary embodiment, by setting a profile message to be displayed only to a targeted friend, a message can be naturally transmitted even when it is difficult to input a message through a chat room. According to the exemplary embodiment, a user can set profile information differently for each friend, thereby obtaining the effect of using a plurality of accounts with a single account, and protecting privacy and personal information exposed by profile information.

According to the present disclosure, the instant messaging service can increase the utilization of the user profile to provide user information. Specifically, according to exemplary embodiments, a user profile can be displayed only to a targeted friend by using a user profile as a message transmission means. In addition, a user or the other party can easily perform an operation related to a profile message through an application/service linked with the profile message through conjunction between the user profile and various applications/services.

According to the present disclosure, when the other party completes an operation related to the profile message (e.g. confirmation completion, remittance completion) or a time period related to the profile message has expired, a default user profile is displayed to the other party such that user profile management can be supported.

BRIEF DESCRIPTION OF THE DRAWINGS

FIG. 5 shows an example of a user profile information providing screen including a confirmation request message according to the exemplary embodiment.

DETAILED DESCRIPTION OF THE EMBODIMENTS

Figure 1:
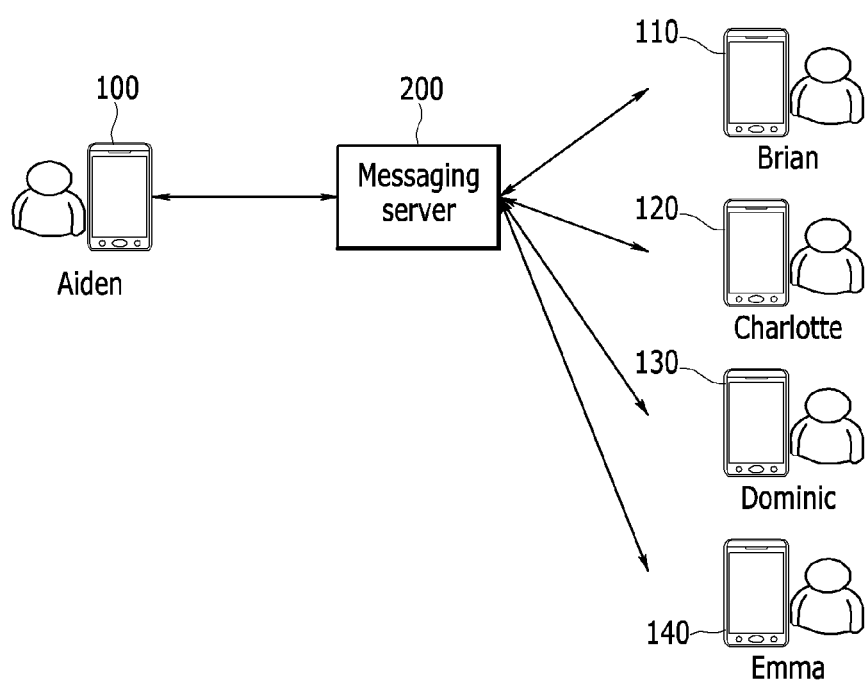
FIG. 1 is a schematic diagram of an instant messaging service system according to an exemplary embodiment.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

A terminal includes as instant messaging application which is software stored in a computer readable storage medium, and hardware such and a processor, a memory, a display, a communication module, and the like. The processor cooperates with hardware to drive instant messaging applications. The display may display a user interface screen provided by the instant messaging application and receive user input, for example, a touch input. The communication module communicates with a messaging server through a communication network.

The terminal may be implemented in various forms and may be exemplarily implemented in the form of a computer terminal, but it may be implemented in the form of a computer, a wearable device, a TV terminal, or the like, such as a pad type of terminal such as a smart pad or a laptop computer.

Figure 2:
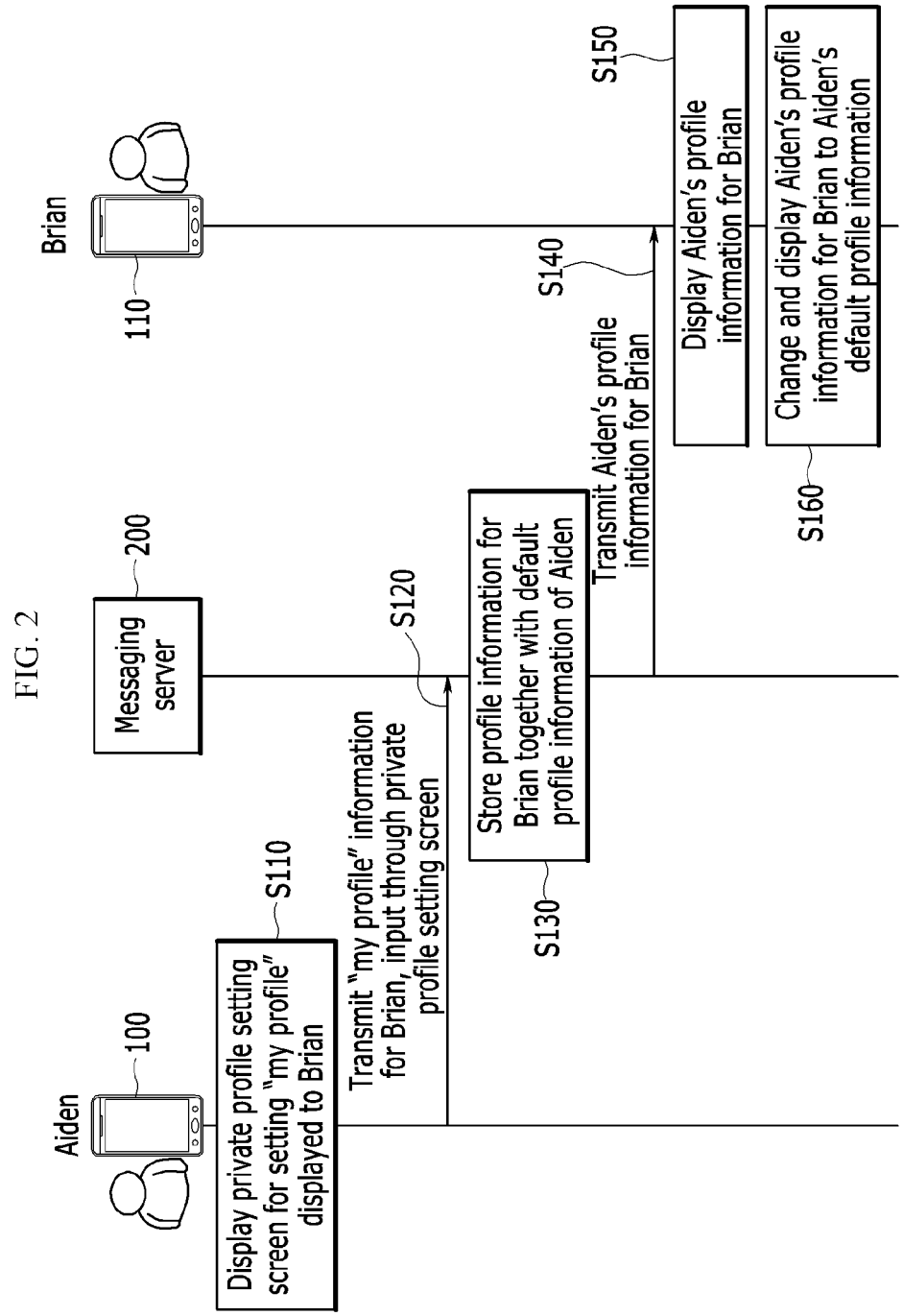
FIG. 2 is a flowchart of a method for providing user profile information to a specific party according to the exemplary embodiment.

FIG. 1 is a schematic diagram of an instant messaging service system according to an exemplary embodiment, and FIG. 2 is a flowchart of a method for providing user profile information to a specific counterpart according to the exemplary embodiment.

Referring to FIG. 1, terminals where an instant messaging application is installed use functions provided by the instant messaging application by accessing a messaging server 200.

The instant messaging application is a program that sets and displays user profile information as described in the present disclosure. When users input messages such as texts, images, videos, and emoticons in chat rooms provided by the instant messaging application, the messaging server 200 transmits the messages input in the chat room to a terminal of other users in the chat room. In the present disclosure, a user designates a targeted friend from online friends who have made friends in an instant messaging application and changes his or her profile information, and the subject who changes his or her profile information is called a user and the user can call a specified friend among friends as a targeted friend or the other party to change profile information.

For convenience of description, it is set that terminal A 100 is Aiden's terminal, terminal B 110 is Brian's terminal, terminal C 120 is Charlotte's terminal, terminal D 130 is Dominic's terminal, and terminal E 140 is Emma's terminal. In the instant messaging application, Aiden is friends with Brian, Charlotte, Dominic, and Emma, and Aiden may set a counterpart among Brian, Charlotte, Dominic, and Emma and change his profile information.

Aiden may set at least one of friends in the instant messaging application as a specific party, and change his profile information such that profile information that is different from default profile information can be displayed to the specific party by using various methods. Here, the profile information displayed only to the specified party is referred to as "my profile" information, and the profile information for the other party may be different from the default profile information, or may include additional information in the default profile information. The changed information in the default profile information or the information added to the default profile information functions as a message displayed only to the other party. Therefore, hereinafter, information set in "my profile" information for the other party is referred to as "profile message" in order to distinguish from general messages input in the chat room. In addition, in the following description, "my profile" information for the other party may be referred to as private profile information.

According to an exemplary embodiment, "my profile" information for the other party may be different from profile information in default profile information in at least one of a name, a picture, a status message, and the like. For example, Aiden may be profile information for Brian to display a message for Brian (e.g., "Brian, lunch 20") instead of displaying a name (e.g., "Aiden") set in the default profile information of the instant messaging application. In this case, instant messaging applications of Charlotte, Dominic, and Emma display "Aiden" in the friends list or in the chat room. The instant messaging application of Brian displays "Brian, lunch 20", which is set by Aiden for Brian, instead of displaying "Aiden". Similarly, Aiden may set a profile picture or status message that is displayed only in Brian's instant messaging application as profile information for Brian, instead of a profile picture or status message in the default profile information.

According to another exemplary embodiment, "my profile" information for the other party may further include additional information in the default profile information. A location where the additional information is displayed in the instant messaging application or a method for displaying additional information is displayed in the instant messaging application may vary. For example, Aiden may set "my profile" information to additionally display a profile message (e.g., "Brian, lunch 20") for Brian near a name ("Aiden") displayed in the instant messaging application of Brian, additionally display a profile message for Brian near a profile picture, or display a profile message for Brian in the background of the chat room in which Brian and Aiden participate.

In the present disclosure, the profile message is not limited to a text message or a picture, but may be a message including various functions implemented. At lease one function may be implemented and embedded in the profile message. In addition, the profile message may include an icon (e.g., a banking icon in case of a billing message, a calendar icon in case of a D-day message, and the like) that indicates a corresponding function. For example, the profile message may be a billing message such as a payment request/remittance request that is associated with a payment/banking application, and may include a function of interlocking with a payment/banking application by selecting the corresponding message or a banking icon included in the message. The profile message may be a time-related alarm message interlocked with a D-day calculation application, and may include a function of switching to D-100, D-99, etc. in conjunction with the D-day calculation application.

Referring to FIG. 2, a method for providing user profile information for the other party in conjunction with a terminal A 100, a terminal B 110, and a messaging server 200 that communicate with the terminals A 100 and B 110 in a case than Aiden sets "my profile" information for Brian in the instant messaging application will be described.

The terminal A 100 displays a private profile setting screen for setting "my profile", which will be displayed in the screen of Brian (S110). The private profile setting screen may be accessed from Brian's profile screen, or by selecting Brian from friends in the "my profile" management screen.

The terminal A 100 transmits "my profile" information for Brian, input through the private profile setting screen, to the messaging server 200 (S210). The "my profile" information for the other party may be called private profile information distinguished from the default profile information. The "my profile" information for the other party may include a profile item (name, photo, status message, and the like) that is changed in the default profile information, or additional items in the default profile information. The private profile setting screen may provide a screen through which a message to be transmitted to the other party can be input instead of a profile name, or may provide a screen through which a message to be transmitted to the other party can be additionally input without changing the default profile information. For example, "my profile" information for Brian may be set to a profile message (e.g., "Brian, lunch 20") instead of a user name. The profile message for the other party may be a simple text, but the profile message may be interlocked with various applications/services. For example, a billing message (e.g., "Brian, lunch 20") such as a payment request/remittance request may be input as a profile message through the private profile setting screen by interlocking with the payment/banking application. Net, Brian may move to the payment/banking application linked to the profile message through a specified operation such as clicking on the profile message, and may send money to Aiden through the payment/banking application. The private profile setting screen may support profile message input that includes a confirmation request message (e.g., "Brain, have lunch this Saturday 1 pm?") for a schedule or information reception, and the like. Next, when Brian confirms the confirmation request message (e.g., when Brian clicks on the profile message), a message confirmation notification service linked to the profile message may notify Aiden that the profile message confirmation has been completed. The private profile setting screen may support a profile message input that includes time-related notification messages such as a D-day, an anniversary, a meeting schedule, and the like in conjunction with the D-day calculation application or a calendar.

The messaging server 200 stores profile information for Brian, received from the terminal A, together with default profile information of Aiden (S130). For example, as shown in Table 1, the messaging server 200 stores profile information of Aiden, displayed to Brian, differently from the default profile information displayed to other friends. The messaging server 200 may provide Brian with the profile information for Brian for a valid time period. The valid time period may be determined to be a predetermined time period (e.g., 24 hours, a week, and the like), or may be determined according to whether or not an operation related to the profile message exists.

TABLE 1

| Friends list of Aiden | Profile information of Aiden displayed to friends |
|---|---|
| Brian | Name: Brian, lunch $20 |
|  | Photo: default profile information |
|  | Status message: default profile information |
| Charlotte | Name: Default profile information (Aiden Kim) |
| Dominic | Photo: default profile information |
| Emma | Statue message: default profile information |

The messaging server 200 transmits Aiden profile information for Brian to the instant messaging application of the terminal B 110 (S140).

The terminal B 110 displays the Aiden profile information for Brian on the instant messaging application screen instead of displaying default profile information of Aiden (S150). For example, Aiden, who is a friend of Brian, is disposed as "Aiden", which is a name included in the default profile information on the instant messaging application screen, and then changed to "Brian, lunch 20" according to Aiden profile information for Brian. In this case, a method for displaying the Aiden profile information for Brian on the instant messaging application screen of the terminal B 110 may vary. For example, the terminal B 110 may display "Brian, lunch 20", which is a profile message set for Brian by Aiden, instead of displaying "Aiden" in a friend list screen including Aiden or a chat room in which Brian and Aiden participate.

Alternatively, the terminal B 110 may display "Brian, lunch 20", which is a profile message set for Brian by Aiden near the name or profile photo of Aiden or in the background of the chat room. When Aiden, Brian, Charlotte, Dominic, and Emma group-chat in one chat room, the terminal B 100 of Brian displays a profile of Aiden as "Brian, lunch 20", but terminals of Charlotte, Dominic, and Emma display the profile of Aiden as "Aiden".

Next, the terminal B 110 may change the profile information of Aiden for Brian in the instant messaging application screen to default profile information of Aiden, and then displays the default profile information of Aiden (S160). The terminal B 110 may inform the messaging server 200 that Aiden profile information for Brian has been changed to default profile information, and the messaging server 200 may inform the terminal A 100 that Aiden profile information for Brian has been changed to default profile information. Thus, Aiden can recognize his profile information displayed to Brian. According to an exemplary embodiment, when receiving default profile information of Aiden from the messaging sever 200, the terminal B 110 may change Aiden's profile information for Brian to default profile information of Aiden. The messaging server 200 determines a valid time period for Aiden's profile information for Brian, and may transmit the default profile information of Aiden to the terminal B 110 when the valid time period has expired. The valid time period may be variously set and determined. For example, the valid time period may be set (e.g., 24 hours, a week, and the like) within a predetermined time period range by Aiden or the messaging server 200, or may be terminated when an operation related to the profile message is completed (e.g., confirmation is completed, remittance is completed).

According to another exemplary embodiment, the terminal B 110 may determine a valid time from the Aiden profile information for Brian (e.g., a profile message including the D-day calculation function is changed to default profile information after D-day), or may change Aiden's profile information for Brian to default profile information of Aiden according to a valid time period (e.g., 24 hours) set in the Aiden profile information for Brian.

Figure 3:
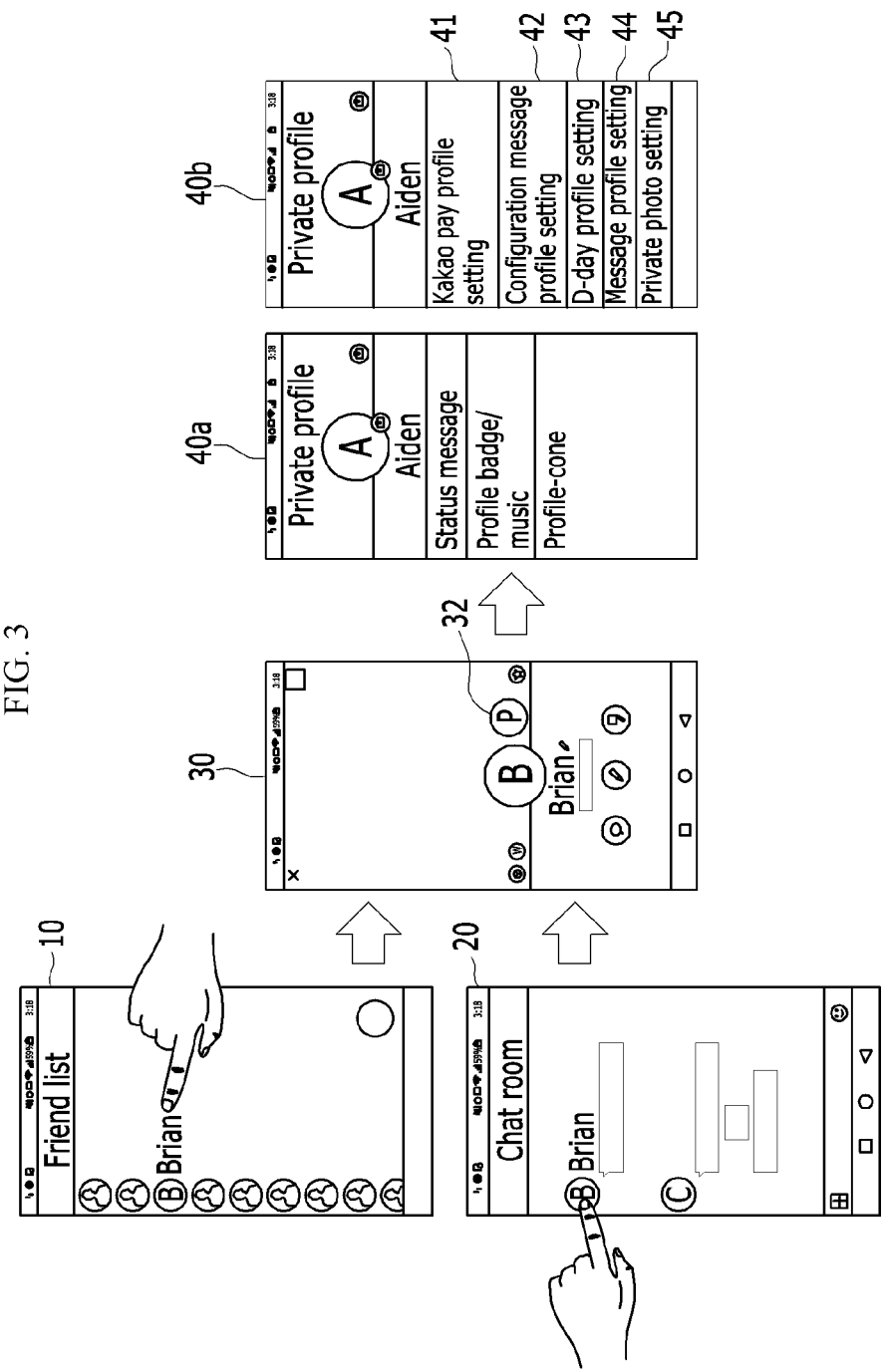
FIG. 3 is an example of a private profile setting screen according to the exemplary embodiment.

FIG. 3 is an example of the private profile setting screen according to the exemplary embodiment.

Referring to FIG. 3, when Aiden wants to change his profile information and transmits a profile message to Brian, Aiden executes the instant messaging application of the terminal A 100. Next, Aiden selects a profile of Brian in the instant messaging application. Aiden may select a Brian's profile from a friend list screen 10 or may select a Brian's profile in a chat room 20 in which Brian participates.

The terminal A 100 displays a profile screen 30 of Brian, selected by Aiden. In this case, the profile screen 30 of Brian displays a profile name, a profile photo, and the like set by Brian, and may include a profile change button 32. The profile change button 32 is an entry point to a private profile setting screen that allows Brian to change Aiden's profile displayed to Brian.

When the profile change button 32 is selected, the terminal A 100 displays a private profile setting screen 40. A private profile setting screen 40*a* includes profile information that can be changed. For example, the private profile setting screen 40*a* may include a name, a profile photo, a background photo, a status message, a profile badge/music, a profile cone, and the like. The private profile setting screen 40*a* may include a function for setting a valid time period of private profile information.

A private profile setting screen 40*b* may be interlinked with an application/service. For example, the private profile setting screen 40*b* may include a Kakao pay profile setting tab 41 that enables inputting a billing message such as a payment request/a remittance request through interaction with a payment/banking application. The range of interactions between payment/banking applications and profile messages can vary. For example, when Brian clicks on a profile message, a page of the associated application will open, or when Brian clicks on a profile message, a page where a bill (20) input when Aiden writes a billing message can be sent will open.

In addition, the private profile setting screen 40*b* may include a configuration message profile setting tab 42 through which a confirmation request message that is linked with a message confirmation notification service can be input, a D-day profile setting tab 43 through which a time related notification message that is linked with the D-day calculation application/calendar can be input, a message profile setting tab 44 through which a text message can be input, and a private photo setting tab 45 through which a photo provided only to the other party can be input.

Meanwhile, Aiden may set a private profile for Brian in an application (e.g., the payment/banking application) that provides a private profile setting function through interaction with the instant messaging application. For example, the payment/banking application provides a profile setting screen, and may call a friend list by interacting with the instant messaging application. Then, Aiden may select Brian's profile in the friend list, and then may input a profile message ("Brian, lunch 20").

In FIG. 3, the profile change button 32 of the profile 30 of Brian is described as an entry point of the private profile setting screens 40*a* and 40*b*, but the entry point may be variously implemented.

For example, when Aiden selects a Brian's profile in the friend list screen 10 or in the chat room 20 with a predetermined operation, Aiden can enter the private profile setting screens 40*a* and 40*b*. Here, an operation for entering the private profile setting screen may be long-tapping of pressing the profile of Brian for a long time, but there is a case in which a separate touch time or touch intensity (e.g., a long tapping operation) may be determined for the operation carried out for entering the private profile setting screen.

When Aiden selects the profile of Brian in the friend list screen 10 or in the chat room 20 with a predetermined operation, a private profile setting pop-up (not shown) may be displayed. The private profile setting pop-up may be implemented to input a name, a profile photo, a background photo, a status message, and the like of the private profile setting screen 40*a*, or may be implemented to include the Kakao pay profile setting tab 41, the private profile setting screen 40*b*, the D-day profile setting tab 43, the message profile setting tab 44, or the private photo setting tab 45.

Figure 4:
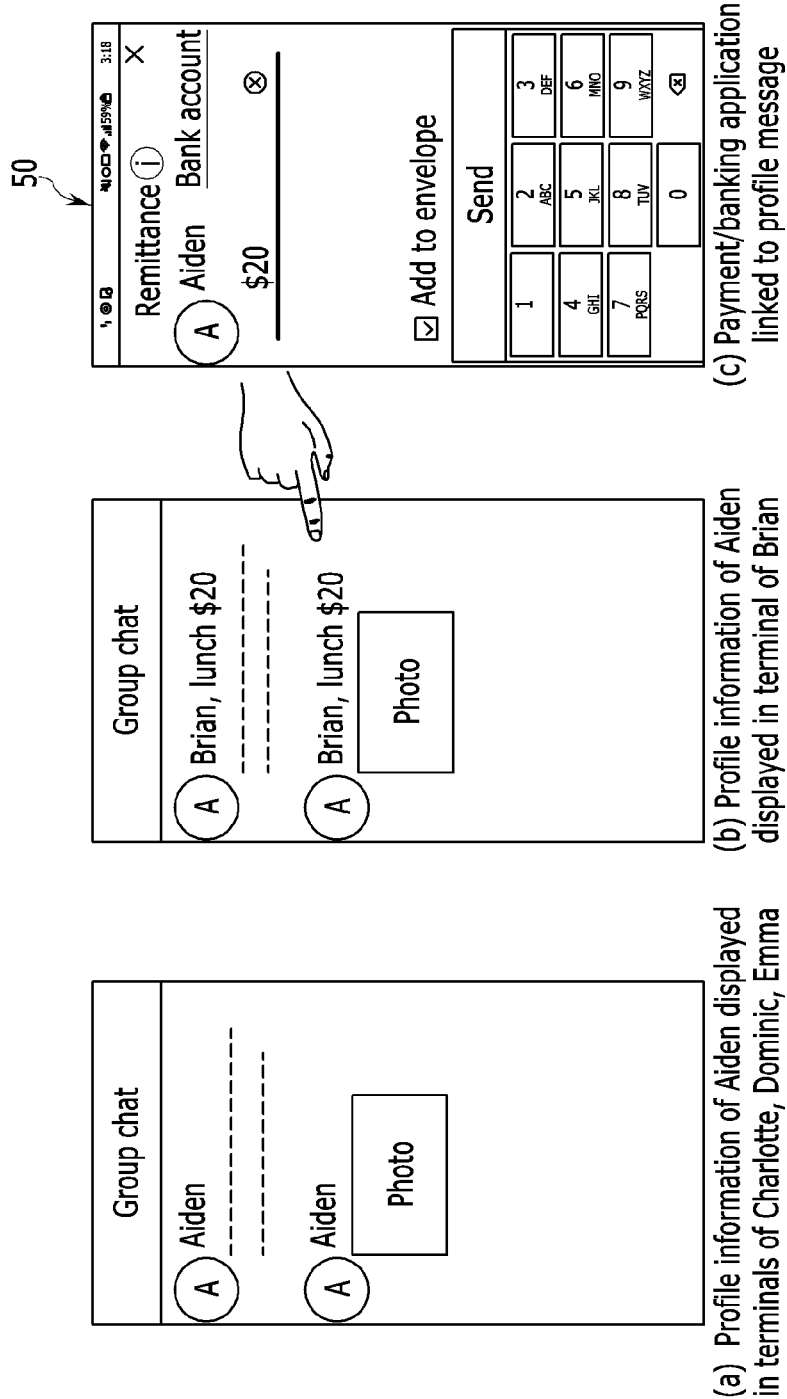
FIG. 4 shows an example of a user profile information providing screen including a billing message according to the exemplary embodiment.

FIG. 4 shows an example of a user profile information providing screen including a billing message according to the exemplary embodiment.

Referring to (a) in FIG. 4, when Aiden, Brian, Charlotte, Dominic, and Emma group-chat in one chat room, Aiden sends a message and a photo. Terminals of Charlotte, Dominic, and Emma display "Aiden", which is a name included in the default profile information of Aiden.

Referring (b) in FIG. 4, since Aiden sets "Brian, lunch S20" as Aiden profile information for Brian, the terminal B 110 of Brian displays the profile of Aiden as "Brian, lunch 20", unlike other terminals of Charlotte, Dominic, and Emma.

That is, in the same chat room, the profile of Aiden is displayed differently according to "my profile" information set by Aiden for a specific other party.

Referring to (c) in FIG. 4, the profile message may be a billing message linked with the payment/banking application. For this, when Aiden writes a profile message by setting a bill amount (20), Brian's terminal B 110 displays Aiden's profile message, which is different from the default profile message of Aiden. In this case, the bill amount (20) may be displayed in the profile message, or may be hidden.

When Brian selects the profile message of Aiden, which is "Brian, lunch 20", Brian's terminal B 110 displays a remittance page 50 of the payment/banking application linked to the profile message. The remittance page 50 is a page through which money can be sent to Aiden's bank account or to the account of Aiden in the application.

In this case, the bill amount (S20) hidden in the profile message may be automatically written as a remittance amount in the remittance page 50, or the amount of money (20) extracted from the profile message may be automatically written as a remittance amount in the remittance page

50. Alternatively, Brian may directly enter the remittance amount (20) in the remittance page 50.

When Brian sends the bill amount (20) set by Aiden to Aden in the remittance page 50, the terminal B 110 of Brian may inform the messaging server 200 that an operation (i.e., remittance) related to the profile message set by Aiden has been carried out. The messaging server 200 may control the terminal B 100 to use default profile information of Aiden based on an operation performance result with respect to a profile message received from the terminal B 110 of Brian. The messaging server 200 may transmit the default profile information of Aiden to the terminal B 110 after confirming that the bill amount (20) set by Aiden as the profile message has been normally transmitted in cooperation with the payment/banking application. On the other hand, when the messaging server 200 receives revocation of the profile information set for Brian from the terminal A 100 of Aiden or completion of the operation related to the set profile message, the messaging server 200 may transmit the default profile information of Aiden to the terminal B 110.

Next, the terminal B 110 displays "Aiden" included in the default profile information of Aiden, together with the terminals of Charlotte, Dominic, and Emma.

FIG. 5 shows an example of a user profile information providing screen including a confirmation request message according to the exemplary embodiment.

Referring to FIG. 5, Aiden enters "Brian, have lunch this Saturday 1 pm?" as a profile message in the private profile setting screen for Brian. Then, when Aiden, Brian, Charlotte, Dominic, and Emma group-chat in one chat room, the terminal B 110 of Brian displays Aiden's profile as "Brian, have lunch this Saturday 1 pm?". As previously described with reference to FIG. 4, unlike the terminal B 110 of Brian, the terminals of Charlotte, Dominic, and Emma display "Aiden", which is Aiden's name included in the default profile information of Aiden. As described, Aiden may set a message that can be seen only by Brain through profile information.

Aiden can enter "Brian, have lunch this Saturday 1 pm?" in the private profile setting screen, and can also enter schedule information such as a date, a place, and the like in conjunction with the calendar application. In this case, the schedule information may be displayed in the profile message or may be hidden. The profile message and the calendar application may be linked so that the hidden schedule information can be automatically entered into Brian's calendar.

The profile message may be a confirmation request message linked with the message confirmation notification service. Brian may complete confirmation using various methods, and for example, may complete confirmation by clicking on the profile message. Then, the terminal 110 of Brian may inform the messaging server 200 that the operation related to the profile message set by Aiden (confirmation completed) is performed. When the profile message, which is the confirmation request message, is selected, the terminal B 110 of Brian sends a confirmation completion message with respect to the profile message to the messaging server 200.

The messaging server 200 controls the terminal B 110 to use the default profile information of Aiden. Then, the terminal B 110 displays "Aiden" included in the default profile information of Aiden, like the terminals of Charlotte, Dominic, and Emma.

The messaging server 200 notifies the terminal A 100 of Aiden of profile message confirmation of Brian.

Figure 6:
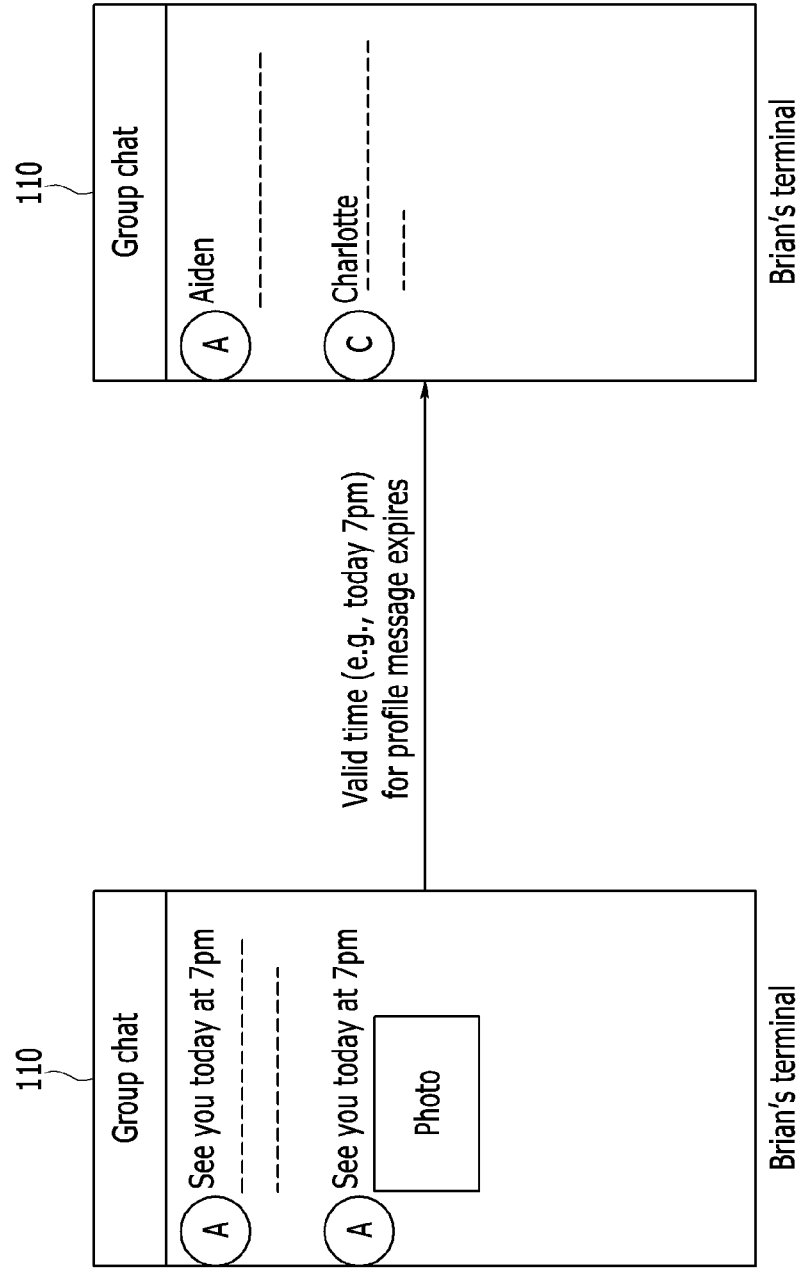
FIG. 6 shows an example of the user profile information providing screen including a time-related alarm message according to the exemplary embodiment.

FIG. 6 shows an example of the user profile information providing screen including a time-related alarm message according to the exemplary embodiment.

Referring to (a) in FIG. 6, Aiden enters a profile message, "Brian, see you today at 7 pm" in the private profile setting screen for Brian. Then, when Aiden, Brian, Charlotte, Dominic, and Emma group-chat in one room, the terminal B 110 of Brian displays Aiden's profile as "Brian, see you today at 7 pm".

Referring to (b) in FIG. 6, the messaging server 200 controls the terminal B 110 to use the default profile information of Aiden when a valid time period of the profile message has expired. That is, the terminal 110 of Brian displays the profile of Aiden as "Brian, see you today at 7 pm" during the valid period of time of the profile message, and displays the default profile information of Aiden when the valid time period has expired. The valid time period may be manually set to "7 p.m. today" by Aiden, or the messaging server 200 of the terminal B 110 may extract a schedule included in the profile message.

Figure 7:
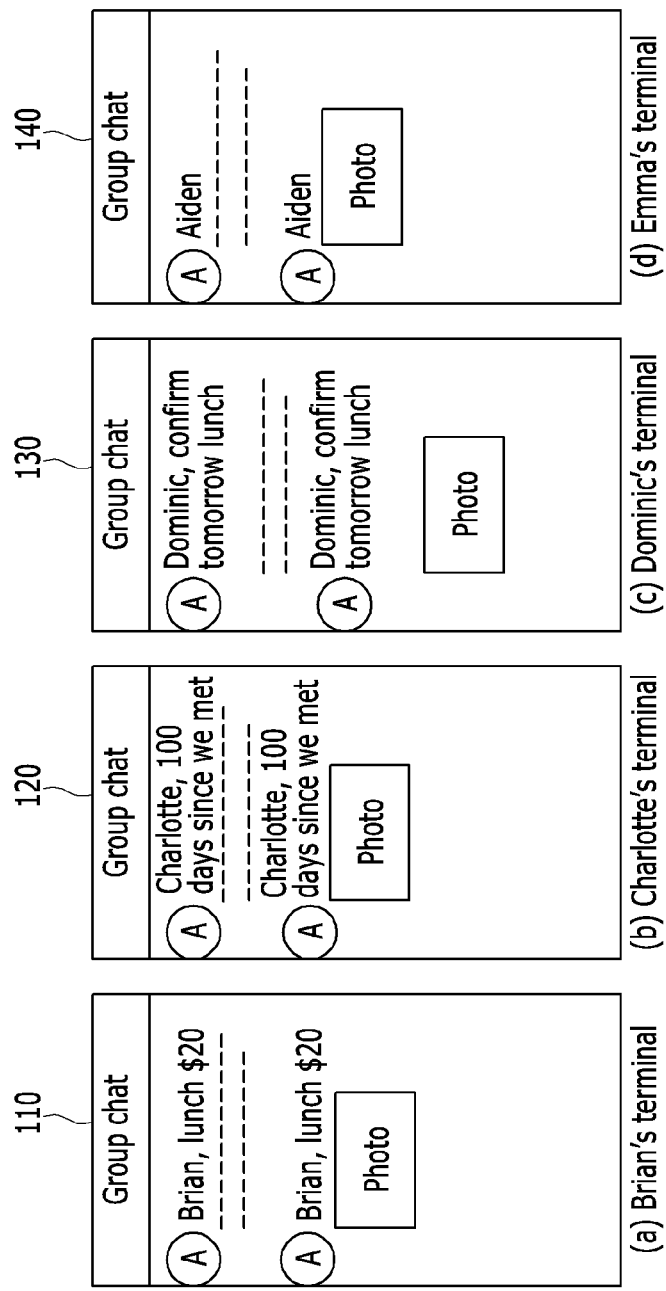
FIG. 7 shows an example of a screen that provides different user profile information to friends according to the exemplary embodiment.

FIG. 7 shows an example of a screen that provides different user profile information to friends according to the exemplary embodiment.

Referring to FIG. 7, Aiden enters "Brian, lunch 20" as a profile message in the private profile setting screen for Brian. Aiden enters "Charlotte, 100 days since we met" as a profile message in the private profile setting screen for Charlotte. In this case, the profile message "Charlotte, 100 days since we met" may be changed to "Charlotte, 101 days since we met", "Charlotte, 102 days since we met" over time in conjunction with the D-day calculation application/calendar. Aiden enters "Dominic, confirm tomorrow lunch" as a profile message in the private profile setting screen for Dominic.

When Aiden, Brian, Charlotte, Dominic, and Emma group-chat in one chat room, as shown in (a) in FIG. 7, the terminal B 110 of Brian displays the profile of Aiden as "Brian, lunch 20", a terminal C 120 of Charlotte displays "100 days since we met" as shown in (b) in FIG. 7, a terminal D 130 of Dominic displays "Dominic, confirm tomorrow lunch please" as shown (c) in FIG. 7, and a terminal E 140 of Emma displays "Aiden", which is a name included in the default profile information of Aiden as shown in (d) of FIG. 7.

Figure 8:
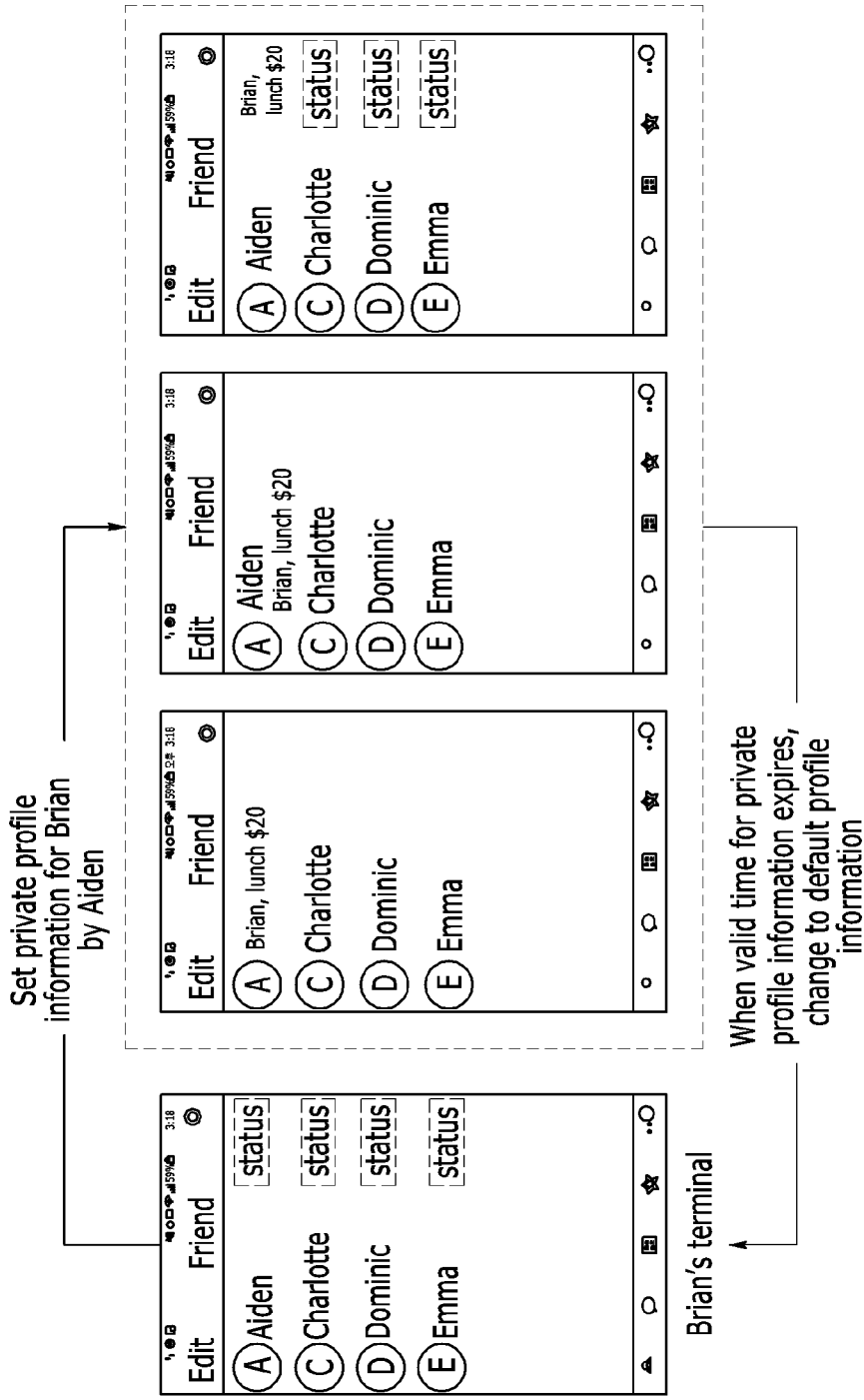
FIG. 8 shows an example of private profile information displayed in the friend list according to the exemplary embodiment.

FIG. 8 shows an example of private profile information displayed in the friend list according to the exemplary embodiment.

Referring to FIG. 8, when Aiden enters "Brian, lunch 20" as a profile message for Brian in the private profile setting screen, the terminal B 110 of Brian may display "Brian, lunch 20" instead of "Aiden" as profile information of Aiden in the friend list of the instant messaging application.

A display location of the private profile information may be changed depending on an item set by Aiden, or may be changed according to a display location provided by the instant messaging application. For example, a profile message set in private profile information may be displayed in a profile name or at the periphery of a basic profile name. Alternatively, a profile message set in the private profile information may be displayed at a status message location.

As described, according to the exemplary embodiment, profile information such as his/her name, photo, and status message is set differently according to friends, and various information or feelings can be freely expressed through his/her profile information depending on a relationship between the user and the friend. According to the exemplary embodiment, by setting a profile message to be displayed only to a targeted friend, a message can be naturally transmitted even when it is difficult to input a message through a chat room. According to the exemplary embodiment, the user can set the profile information differently for each friend group, thereby obtaining the effect of using a plurality of accounts as a single account, and protecting the privacy and personal information exposed due to the profile information.

According to the exemplary embodiment, an instant messaging service can increase the utilization of user profiles for providing user information. Specifically, according to exemplary embodiments, a user profile can be displayed only to a targeted friend by using a user profile as a message transmission means. In addition, a user or the other party can easily perform an operation related to a profile message through an application/service linked with the profile message through conjunction between the user profile and various applications/services.

According to the example embodiment, when the other party completes an operation related to the profile message (e.g. confirmation completion, remittance completion) or a time period related to the profile message has expired, the default user profile is displayed to the other party such that user profile management can be supported.

The exemplary embodiments of the present disclosure described above are not implemented only through the apparatus and the method, and can be implemented through a program which realizes a function corresponding to a configuration of the exemplary embodiments of the present disclosure or a recording medium having the program recorded therein.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for providing user profile information of an instant messaging application by a terminal, comprising:
   when a private profile setting is requested, displaying a private profile setting screen in which user's default profile information set for friends is changed for a targeted friend;
   receiving private profile information which includes a profile message set for the targeted friend and a function embedded in the profile message, in the private profile setting screen; and
   transmitting the private profile information for the targeted friend to the messaging server,
   wherein the private profile information is displayed only to a terminal of the targeted friend as a profile of the user,
   the default profile information is displayed as a profile of the user on terminals of friends other than the targeted friend, and
   the function is performed when the profile message is selected by the targeted friend.

2. The method of claim 1, wherein the private profile setting screen is an interface screen where at least one of a name, a photo, and a status message included in the default profile information is specifically changed for the targeted friend.

3. The method of claim 1, wherein the private profile setting screen comprises a profile setting region where a billing message that requests the targeted friend for payment or remittance is input as the profile message,
   the function includes a function of linking the billing message with a payment/banking application, and
   the amount of bill requested through the billing message is paid or sent from the terminal of the targeted friend by the payment/banking application when the billing message is selected.

4. The method of claim 3, further comprising,
   after private profile information including the billing message is transmitted to the messaging server,
   receiving a payment completion message or a remittance completion message with respect to an amount of a bill required through the billing message, or
   receiving a notification message notifying that the private profile information is changed to the default profile information.

5. The method of claim 1, wherein the private profile setting screen comprises a profile setting region through which a message transmitted to the targeted friend is written and a confirmation request message that request confirmation with respect to the content written in the message is input as the profile message,
   the function includes a function of linking the confirmation request message with a message confirmation notification service, and
   the method further comprises, when the confirmation request message is selected,
   receiving a confirmation completion result of the targeted friend with respect to the confirmation request message by the message confirmation notification service, or
   receiving a notification message notifying that the private profile information is changed to the default profile information by the message confirmation notification service.

6. The method of claim 1, wherein the private profile setting screen comprises a profile setting region through which a time-related alarm message is input to the targeted friend as the profile message, and
   the function includes a function of linking the time-related alarm message with a time calculation application or a calendar application.

7. The method of claim 1, wherein the displaying the private profile setting screen displays the private profile setting screen when a region where a "my profile" change function is assigned in a profile screen of the targeted friend.

8. The method of claim 1, wherein the receiving of the private profile information further includes receiving a valid time period of the private profile information, and
   after the valid time period has expired, the default profile information instead of the private profile information is displayed in the terminal of the targeted friend.

9. A method for providing friend profile information of an instant messaging application by a terminal of a user, comprising:
   receiving private profile information of a friend from a messaging server;
   displaying the private profile information which includes a profile message set for the user and a function embedded in the profile message, as a profile of the friend in an interface screen of the instant messaging application, instead of default profile information of the friend; and
   performing the function when receiving a selection of the profile message,
   wherein the private profile information is different from the default profile information that is displayed as the profile of the friend in an interface screen of the instant messaging application for users other than the user.

10. The method of claim 9, wherein the private profile information comprises information that is different from at least one of a name, a photo, and a status message included in the default profile information.

11. The method of claim 9, wherein, when the private profile information includes a billing message that includes a payment request or a remittance request, the displaying of the private profile information as the profile of the friend displays a billing message as the profile message of the friend,
the function includes a function of linking the billing message with a payment/banking application, and
the method further comprises:
when the billing message is selected, displaying the payment/banking application that is linked to pay or send a bill amount requested in the billing message; and
changing the profile of the friend to the default profile information from the private profile information after payment or remittance with respect to the bill amount requested in the billing message is completed.

12. The method of claim 9, wherein the private profile information as the profile of the friend displays a confirmation request message included in the private profile information as the profile of the friend,
the function includes a function of linking the confirmation request message with a message confirmation notification service, and
the method further comprises:
when the confirmation request message is selected, transmitting a confirmation completion message with respect to the confirmation request message to the messaging server by the message confirmation notification service; and
changing the profile of the friend to the default profile information from the private profile information.

13. The method of claim 1, wherein the default profile information instead of the private profile information is displayed in the terminal of the targeted friend after an operation corresponding to the function is completed.

14. The method of claim 1, wherein in a chat room, the private profile information is displayed as profile information of the user for the targeted friend, and the default profile information is displayed as profile information of the user for the friends other than the targeted friend.

15. The method of claim 1, wherein the profile message is not a message which is input in a chat room.

16. The method of claim 1, further comprising receiving a selection of the function from among a plurality of functions provided in the private profile setting screen.

17. The method of claim 9, further comprising displaying the default profile information as the profile of the friend instead of the private profile information after an operation corresponding to the function is completed.

18. The method of claim 9, further comprising displaying the default profile information as the profile of the friend instead of the private profile information after a valid time period of the private profile information has expired.

19. The method of claim 9, wherein in a chat room, the private profile information is displayed as profile information of the friend for the user, and the default profile information is displayed as profile information of the users other than the user.

20. The method of claim 9, wherein the profile message is not a message which is input in a chat room.

* * * * *